2 Sheets--Sheet 1.

R. McADAMS.
Combined Harrows and Seeders.

No. 154,265. Patented Aug. 18, 1874.

Witnesses
J. H. Rutherford
T. C. Smith

Inventor.
Rayford McAdams
by Johnson and Johnson
his Attorneys.
Washington, D.C.

2 Sheets--Sheet 2.

R. McADAMS.
Combined Harrows and Seeders.

No. 154,265.  Patented Aug. 18, 1874.

Witnesses  Inventor
J. Rutherford  Rayford McAdams
T. C. Smith  by Johnson and Johnson
 his Attorneys
 Washington, D.C.

THE GRAPHIC CO. PHOTO-LITH. 39 & 41 PARK PLACE, N.Y.

UNITED STATES PATENT OFFICE.

RAYFORD McADAMS, OF FORT SCOTT, KANSAS, ASSIGNOR OF ONE-HALF HIS RIGHT TO JAMES HOLDER.

IMPROVEMENT IN COMBINED HARROWS AND SEEDERS.

Specification forming part of Letters Patent No. 154,265, dated August 18, 1874; application filed February 19, 1874.

*To all whom it may concern:*

Be it known that I, RAYFORD McADAMS, of Fort Scott, in the county of Bourbon and State of Kansas, have invented a new and useful Improvement in Combined Harrow and Seeder, of which the following is a specification:

My invention relates to a combined harrow and seeder, in which the seed is sown broadcast, and harrowed in by a horizontal rotary harrow; and my invention consists of a forward-projecting brace pivoted to the draft-bar strap, in combination with the draft-bar and the axle from which the brace extends to obtain a direct connection of the draft-bar with the axle. My invention consists in the combination of a spring locking-catch with the draft-bar and the tongue, in such a manner as to render the joint of the tongue stiff when the harrow is raised, for the purpose of preventing it from rocking in moving from place to place; also, in the combination of an automatic spring lever-catch of peculiar construction with the pivot-bolt of the harrow and a supporting-bar on the axle, whereby the harrow is suspended from its pivot-bolt by the same lever by which it is raised and lowered, the said lever serving as a suspension-bail for the harrow.

Figure 1:
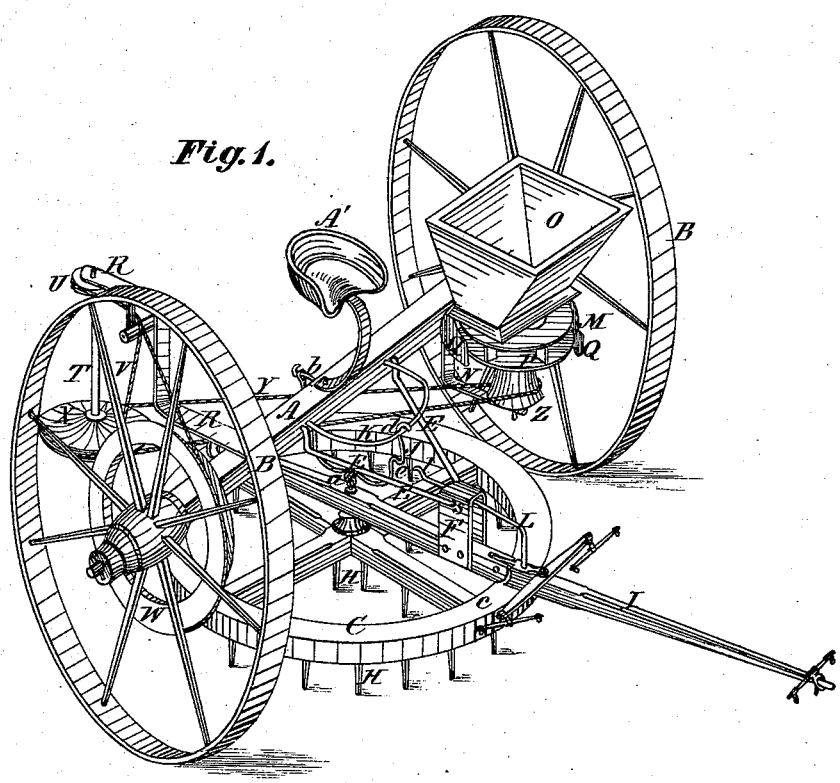
Figure 3:
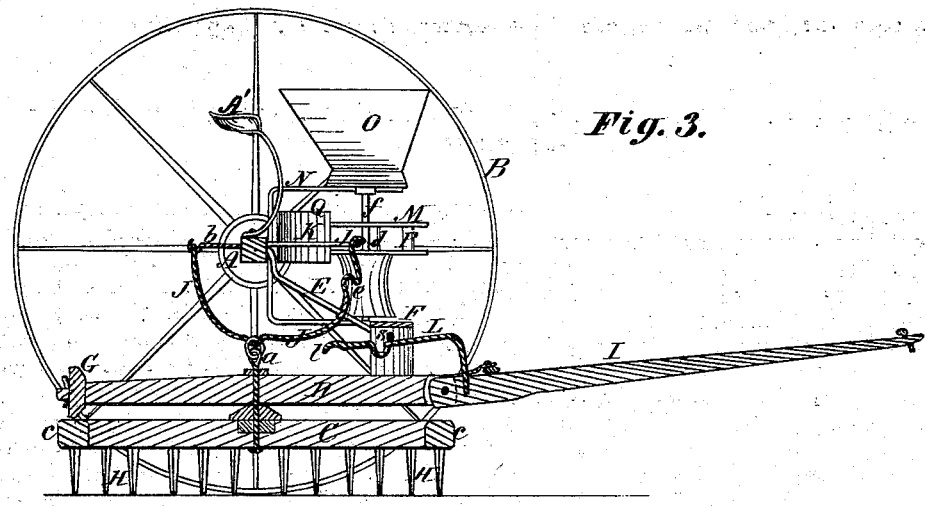
Figure 2:
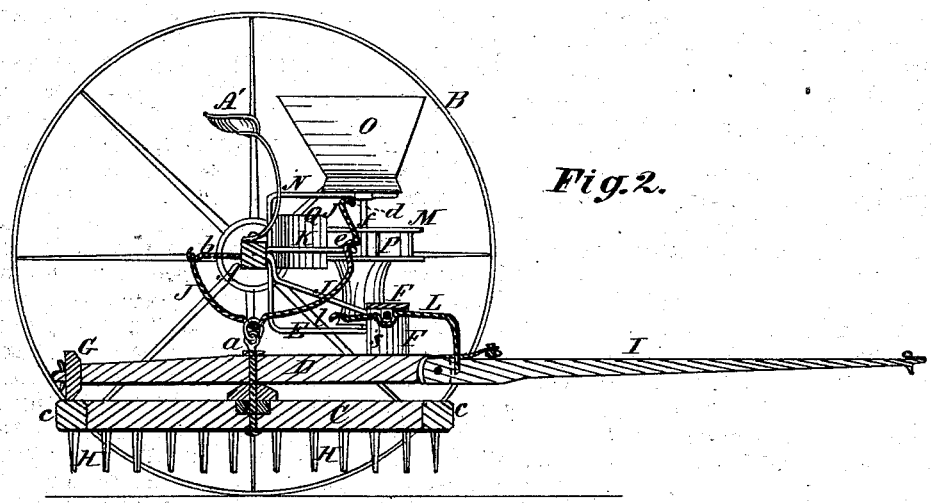

In the accompanying drawings, Figure 1 represents a view, in perspective, of a combined harrow and seeder embracing my invention; Fig. 2, a sectional view, showing the harrow raised and the spring-catch in position to lock the draft-bar and tongue-joint with the axle; and Fig. 3, a similar section with the harrow down and the tongue free to flex.

The frame proper consists of an axle, A, and its supporting-wheels B B, which turn upon their axle-bearings. The harrow C is arranged centrally beneath the axle, and it is connected by a bolt-joint, a, to the draft-bar D, which is, in turn, connected to the axle A by a brace-rod, E, extending from the latter, and pivoted to a strap, F, on the forward end of the draft-bar D, which allows the carrying-wheels and axle to rise and fall without affecting the harrow. This brace E passes through the upper end of the strap F, which is secured to the draft-bar nearly over the rim c of the harrow, and the rear ends of the brace are secured to the axle on each side of the middle of its length, and thus holds the draft-bar rigidly and centrally in the line of the tongue. A roller, G, on the rear end of the draft-bar D, bears upon the rear side of the rim c of the harrow, and holds the latter down with its teeth H in the ground, while the tongue I, being jointed to the front end of the said bar D, draws the machine directly by the brace-connection with the axle. The lever J, for raising and lowering the harrow, consists of a bent rod, its rear end being jointed to an arm, b, on the rear side of the axle, and, curving down beneath the axle, is connected to the center bolt a of the harrow, while the front end of said lever curves upward and is formed into a double hook, d e, which catches into a horizontal rod, K, projecting from the front side of the axle. The upper hook, d, of the lever J is for holding said lever in place when the harrow is down, where it can be easily reached by the driver, whose seat A' is centrally upon the axle, and the lower hook, e, is for catching over the bar K when the lever is raised, to elevate and hold the harrow up from the ground in going from place to place, or for passing over stumps and other obstructions on the ground. In such adjustment the harrow is raised and lowered by the direct attachment of the lever J to the center bolt a, which has the effect of raising and holding the harrow up horizontally. A spring-catch, L, is secured to the inner end of the tongue, and, crossing the joint, projects through the strap F of the draft-bar D, so as to catch into a rod, s, for the purpose of rendering the joint stiff to prevent the harrow from rocking when elevated. This action of the spring-catch L takes place automatically by raising the harrow, and the spring-catch L is released by the driver placing his foot upon its inner end l when the harrow is to be lowered. When the harrow is down the tongue is held upwardly inclined from the draft-bar by its attachment to the horse's hames, and the joint is free to flex; but when the harrow is raised the tongue is in a horizontal line with the draft-bar, and the two are locked together by the spring-catch. The seeding device M is located in front upon one end of the axle, being secured thereto by an angle-iron, N, which supports the seed-box O, and the pivot $f$ of the revolving seed-distributer P, which has a shield, Q, to cause the grain to be thrown out in front as the machine advances. The gearing for operating the seeder is mounted in a metallic frame, R, on the opposite end of the axle, and, projecting in rear thereof, supports a vertical spindle, T, having a small pulley, U, at its upper end, from which a cord, V, leads to a driving-pulley, W, on the carrying-wheel; and from a larger pulley, X, on the lower end of the spindle T, a cord, Y, leads to a pulley, Z, on the spindle of the seeder. This disposition of the seeder and its operating-gearing forms a balance to the machine, not only frontward and backward, but upon the carrying-wheels, and this renders the machine more easily drawn, and better adapted as a combined harrow and seeder.

The harrow is circular, with cross-arms, and the teeth are three-square, so as to cut and break the soil, and it is raised by simply pulling back the lever.

The seeder may be of any suitable construction, and adapted to sow the seed in quantities to suit the soil, as well as different kinds of seed.

I claim—

1. The forward-projecting brace E, pivoted to the draft-bar strap F, in combination with the draft-bar D, the rotary harrow, and the axle A, as and for the purpose described.

2. The spring lever-catch J, pivoted at $a\ b$ to the harrow C and the axle A, and having the spring-catches $d\ e$, in combination with the bow-rod K, substantially as and for the purpose described.

3. The spring-catch L, in combination with the draft-bar D and the tongue, substantially as described, whereby the tongue and bar are made rigid to prevent the harrow rocking when raised from the ground.

RAYFORD McADAMS.

Witnesses:
  CROWEL MIKESELL,
  JAMES HOLDER.